United States Patent Office.

FRIEDRICH STOLZ, OF HÖCHST-ON-THE-MAIN, GERMANY, ASSIGNOR TO THE FARBWERKE, VORMALS MEISTER, LUCIUS & BRÜNING, OF SAME PLACE.

PYRAZOLON COMPOUND AND PROCESS OF MAKING SAME.

SPECIFICATION forming part of Letters Patent No. 579,412, dated March 23, 1897.

Application filed November 7, 1896. Serial No. 611,395. (Specimens.)

*To all whom it may concern:*

Be it known that I, FRIEDRICH STOLZ, a citizen of the Empire of Germany, residing at Höchst-on-the-Main, Germany, have invented certain new and useful Improvements in Manufacturing 1 Phenyl 2.3 Dimethyl 4 Dimethylamido 5 Pyrazolon, of which the following is a specification.

I have found that by methylation of 1 phenyl 2.3 dimethyl 4 amido 5 pyrazolon, 1 phenyl 2.3 dimethyl 4 dimethylamido 5 pyrazolon can be obtained. The methylation can be carried out by means of methylhalogens or their usual substitutes, as well as by heating with formic aldehyde.

The following process has given good results: Ten parts by weight of phenyl 2.3 dimethyl 4 amidopyrazolon are heated with ten parts by weight of methyl alcohol and fourteen parts by weight of methyl iodid for one hour up to 90° centigrade. The alcohol is then distilled off, the residue dissolved in water, and after the addition of alkali the solution is extracted with benzene and then decanted, the new compound being absorbed by the benzene, while the simultaneously-formed ammonium base remains in the aqueous solution. The benzene is distilled off and the residue crystallized from ligroin.

The new compound crystallizes in small tablets and melts at 107° to 108° centigrade. It is easily soluble in alcohol, ether, benzene, and water; less soluble, however, in ligroin. On heating a concentrated aqueous solution the base separates in the form of an oil, which again dissolves on cooling. The methylated base differs from the mother substance phenyl dimethyl 4 amidopyrazolon by its indifference toward benzaldehyde. With salicylic acid the new compound forms a salt, crystallizing in needles and melting at 69° centigrade. It is easily soluble in alcohol, ether, and water. The hydrochlorid of the base is readily soluble in water and alcohol, soluble with difficulty in ether or benzene. It decomposes on heating to about 794° centigrade. With ferric chlorid the base forms a double salt, which crystallizes in yellow needles from alcohol, and which is easily soluble in water and soluble with difficulty in alcohol. The compound has the following formula:

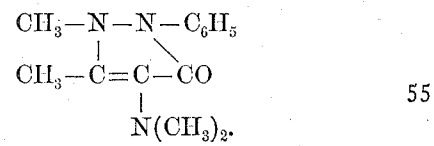

The compound is intended to be used as a fever remedy, and is given in doses of from 0.5-2 grams for adults and in corresponding smaller quantities for children.

When in the alkylation of the phenyl 2.3 dimethyl 4 amidopyrazolon, ethylbromid is substituted for methyl iodid, a diethyl derivative is obtained having the general properties of the dimethyl derivative, but distinguished from the latter by having its melting-point at 95° centigrade.

Having thus described my invention, I claim as new and desire to secure by Letters Patent—

1. The process herein described of manufacturing 1 phenyl 2.3 dimethyl 4 dimethylamido 5 pyrazolon, which consists in methylating 1 phenyl 2.3 dimethyl 4 amido 5 pyrazolon, substantially as set forth.

2. As a new product, the phenyl 2.3 dimethyl 4 dimethylamido 5 pyrazolon being a white crystallized compound, easily soluble in water, alcohol and benzene, less easily soluble in ligroin, having its melting-point at 107° to 108°, while the melting-point of its salicylate is at 69°, substantially as set forth.

In testimony that I claim the foregoing as my invention I have signed my name in presence of two subscribing witnesses.

FRIEDRICH STOLZ.

Witnesses:
HEINRICH HAHN,
ALFRED BRISBOIS.